United States Patent
Drewes et al.

(10) Patent No.: US 8,514,790 B2
(45) Date of Patent: Aug. 20, 2013

(54) SYSTEM AND METHOD FOR OPTIMIZING NETWORK WIRELESS COMMUNICATION RESOURCES

(75) Inventors: Christian Drewes, Germering (DE);
Markus Mueck, Unterhaching (DE);
Thuyen Le, Taufkirchen (DE);
Hyung-Nam Choi, Hamburg (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 12/357,429

(22) Filed: Jan. 22, 2009

(65) Prior Publication Data

US 2010/0182916 A1  Jul. 22, 2010

(51) Int. Cl.
*H04W 4/00* (2009.01)
*H04L 12/28* (2006.01)

(52) U.S. Cl.
USPC ........... 370/329; 370/400; 370/468; 455/445; 455/450

(58) Field of Classification Search
USPC ................. 370/310, 328, 329, 400, 401, 468; 455/422.1, 445, 450
See application file for complete search history.

(56) References Cited

U.S. PATENT DOCUMENTS

| | | | |
|---|---|---|---|
| 952,079 A | 3/1910 | McIntire | |
| 4,549,293 A | 10/1985 | Christian et al. | |
| 5,970,393 A | 10/1999 | Khorrami et al. | |
| 6,473,617 B1 * | 10/2002 | Larsen et al. | 455/446 |
| 7,113,106 B2 * | 9/2006 | Sendrowicz | 370/328 |
| 7,295,960 B2 * | 11/2007 | Rappaport et al. | 455/422.1 |
| 2006/0023681 A1 * | 2/2006 | A'Rafat | 370/401 |
| 2006/0149418 A1 | 7/2006 | Anvari | |
| 2007/0002766 A1 | 1/2007 | Park et al. | |
| 2007/0070954 A1 | 3/2007 | Kim et al. | |
| 2007/0081507 A1 | 4/2007 | Koo et al. | |
| 2007/0284474 A1 | 12/2007 | Olson et al. | |
| 2008/0165881 A1 | 7/2008 | Tao et al. | |
| 2008/0219251 A1 * | 9/2008 | Xue et al. | 370/389 |
| 2008/0238794 A1 * | 10/2008 | Pan et al. | 343/767 |
| 2008/0294766 A1 | 11/2008 | Wang et al. | |
| 2009/0003216 A1 * | 1/2009 | Radunovic et al. | 370/237 |
| 2009/0016258 A1 | 1/2009 | Zhang et al. | |
| 2009/0279462 A1 * | 11/2009 | Luo et al. | 370/310 |
| 2010/0142448 A1 * | 6/2010 | Schlicht et al. | 370/328 |

FOREIGN PATENT DOCUMENTS

| | | |
|---|---|---|
| DE | 3337647 C1 | 7/2003 |
| DE | 10255050 A1 | 6/2004 |
| DE | 10332324 A1 | 2/2005 |
| EP | 0689303 A1 | 12/1995 |
| EP | 0965203 B1 | 7/2008 |
| GB | 2291564 A | 1/1996 |
| WO | 9946899 A2 | 9/1999 |
| WO | 03017581 A1 | 2/2003 |

(Continued)

OTHER PUBLICATIONS

English Abstract of DE 10332324 A1.

(Continued)

*Primary Examiner* — Kerri Rose

(57) ABSTRACT

Embodiments are described that provide methods and radio networks that communicate data between a mobile communication device and a core network. The methods include using network coding to encode data, and communicating a subset of the encoded data between the mobile communication device and the core network through a dynamic relay station.

32 Claims, 8 Drawing Sheets

(56) References Cited

FOREIGN PATENT DOCUMENTS

| WO | 2006047823 A1 | 5/2006 |
| WO | 2007100224 A2 | 9/2007 |
| WO | 2008084394 A2 | 7/2008 |

OTHER PUBLICATIONS

English Abstract of DE 10255050 A1.
English Abstract of DE 3337647 C1.
R. Ahlswede et al., "Network Information Flow", IEEE Transactions on Information Theory, vol. 46, No. 4, Jul. 2000, pp. 1204-1216.
M. Effros et al., "Staufrei fahren auf der Datenautobahn", Spektrum der Wissenschaft, www.spektrum.de/artikel/940422, Mar. 2008, pp. 88-95.
H. Claussen et al., "I, Base Station: Cognisant Robots and Future Wireless Access Networks", IEEE CCNC 2006, Jan. 2006, pp. 595-599.
R. Schoenen, "Relay based Access for Cellular: FDD versus TDD", RWTH Aachen University, Germany, Invited Presentation at IST Event 2006, Nov. 23, 2006, Helsinki, Finland, http://www.cwc-oulu.fi/home/5_IST_PANU06_RS.pdf, pp. 1-23.
C. Fragouli et al., "Network Coding: An Instant Primer", ACM SIGCOMM Computer Communication Review, vol. 36, Issue 1 (Jan. 2006), pp. 63-68.
English Abstract for M. Effros et al., "Staufrei fahren auf der Datenautobahn", Spektrum der Wissenschaft, www.spektrum.de/artikel/940422, Mar. 2008, pp. 88-95.
International Search Report of corresponding PCT/EP2009/064707 mailed May 12, 2010.

\* cited by examiner

SYSTEM AND METHOD FOR OPTIMIZING NETWORK WIRELESS COMMUNICATION RESOURCES

BACKGROUND OF THE INVENTION

Mobile wireless communication systems currently include base stations, having fixed locations and connections to a core network, and mobile communication devices (also referred to as a "User Equipment" or UE, and/or as "terminals") that move within the areas covered by the central base stations, and may also move out of the range of central base stations. As the distance increases between user equipment and base stations increases, the transmission power required for error-free communication also increases, until maximum transmission power is reached and no further increase is possible. Beyond this distance, no communication link may be established, and the user equipment is out of range of the base station, and may need to switch to communication through another base station or cell, if one is available. While increasing the transmission power may increase the range of communication, it may also contribute to interference, reducing the signal quality within the coverage area of a base station or cell, as well as in adjacent coverage areas or cells.

Similar problems may arise as an increasing number of user equipment devices communicate with a base station having limited communication resources. In case of a high traffic load within the coverage area of a single base station or cell, the quality of service may be reduced for users, due to inefficient utilization of available resources, or due to the limits of the available communication resources. The communication resources may be determined by, for example, the base station transmission power, the time/frequency/code channels available depending on the multiple access techniques that are used, and/or the interference generated by an increasing number of users.

One approach to increasing the range and capacity of a wireless communication system is addition of new base stations. Unfortunately, new base stations have a number of drawbacks, including the difficulty of selecting suitable locations, establishment of high bandwidth ongoing connections to a core network and the continuous operating costs of maintaining such connections, and (in some cases) resistance encountered from the residents of the area in which the new base station will be established. Overall, the costs and difficulties of adding new base stations to a wireless communication system may make this an undesirable solution.

Another approach to addressing these range and capacity problems is using relay stations, or "multi-hop" networks. In such systems, the term "hop" generally refers to a communication link between two respective network units, for example between a base station and a user equipment device. For example, in a two-hop network, the communication link is, for example between a base station and a relay station, and between the relay station and the user equipment.

Generally, relay stations are similar to a slimmed-down base station that wirelessly receives data from user equipment or from other relay stations, and wirelessly forward such data to other relay stations or to a base station. Such relay stations are often easier to deploy than a base station—they do not generally require a fixed connection to the core network, and have lower operating costs.

In connection with non-cellular systems, numerous mechanisms have been defined for relay stations, which operate in the context of a multi-hop network. For example, IEEE 802.11s defines a WLAN-MESH approach, introducing new user equipment functions, so that user equipment can be used as multi-hop nodes or relay stations. As another example, IEEE 802.16j defines an extension of the WiMAX standard, so that slimmed base stations (i.e., relay stations) can be positioned within respective WiMAX cells. In both of these examples, user equipment is able to communicate indirectly (i.e., via multiple hops) with a base station at a relatively low transmission power level.

One difficulty with these approaches, however, is that they are generally based on the assumption that the user equipment as well as the base station and relay stations are mostly static. Unfortunately, this assumption does not apply in many cases. For example, user equipment can move very rapidly when the user is in a car or train.

SUMMARY OF THE INVENTION

Embodiments of the invention provide methods and radio networks that communicate data between a mobile communication device and a core network. The methods include using network coding to encode data and communicating a subset of the encoded data between the mobile communication device and the network through a dynamic relay station.

Embodiments further provide a method for selecting relay stations to be in wireless communication with a mobile communication device. The method includes determining that a quality of a service parameter of a first communication link is below a minimum quality of service, selecting a relay station from a relay group comprising a static relay station and a dynamic relay station, and establishing a second communication link with the selected relay station, the second communication link communicating data in parallel with the first communication link.

Embodiments further provide a wireless network for communicating data between a mobile communication device and a core network, the radio network comprising a base station, the mobile communication device, and a dynamic relay station configured to communicate a network encoded subset of the data between the mobile communication device and the base station.

Embodiments further provide an autonomous relay station for communicating data between a mobile communication device and a core network, the autonomous relay station comprising a processor, a radio module, a control module, a motion driver, and a memory, the memory comprising a set of instructions that when executed by the processor causes the autonomous relay station device to relay network encoded data.

Embodiments further provide an opportunistic relay station for communicating data between a mobile communication device and a core network, the opportunistic relay station comprising a processor, a radio module, and a memory, the memory comprising a set of instructions that when executed by the processor causes the opportunistic relay station device to relay network encoded data.

These and other features of the invention will be better understood when taken in view of the following drawings and a detailed description.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION OF ILLUSTRATIVE EMBODIMENTS

Figure 1:
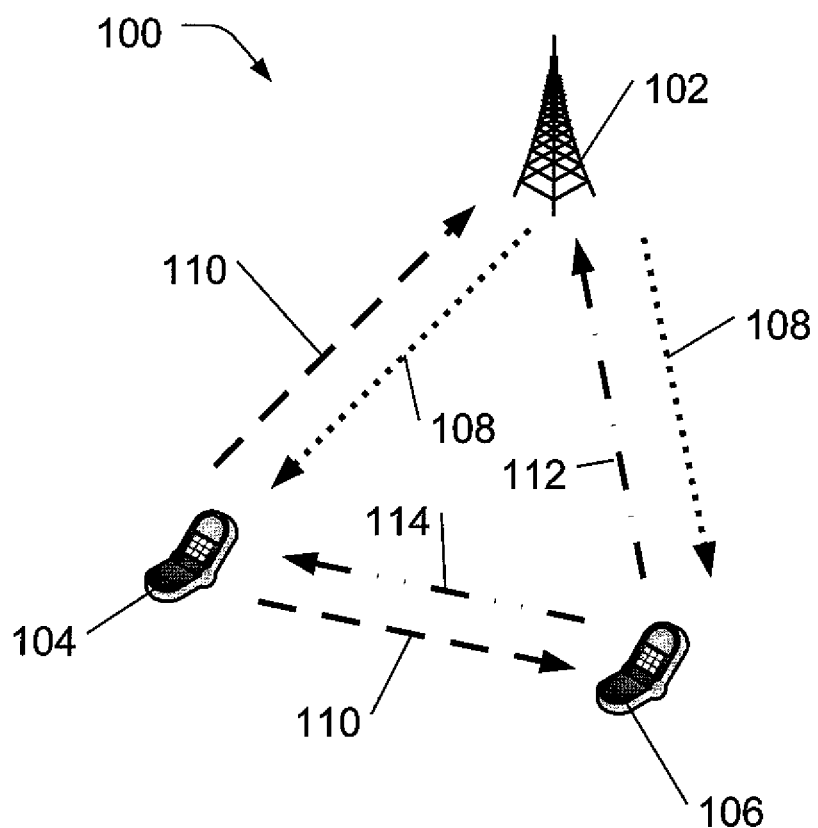
FIG. 1 shows an architectural overview of an example network architecture in accordance with an embodiment of the invention.

In the past, relay stations in multi-hop networks typically had fixed locations and relatively constant coverage areas. However, dynamic relay stations may soon be added to many mobile communication networks. Generally, dynamic relay stations are stations that may change their relay coverage area and/or signal dynamically, including, for example, changing their location, reconfiguring their antennae, or adjusting output power. Although such dynamic relay stations offer the promise of being able to dynamically reconfigure a wireless communication network to improve and adapt network performance to changing needs, they may also lead to added complexity, since user equipment and base stations will no longer be able to rely on a relatively stable wireless network configuration and indeed may be dynamic relay stations themselves. In various embodiments, dynamic relay stations may dynamically change, for example, because of base station initiated commands, other dynamic relay initiated commands, or a dynamic relay station initiating a command itself.

As used herein, dynamic relay stations may include "autonomous" relay stations, which are able to adapt themselves dynamically by controlling attributes such as their physical position, the direction or configuration of their antennae, or other attributes that may dynamically change the coverage of the relay station. For example, by sending out a channel impulse and comparing the sent channel impulse to a received channel impulse, an autonomous relay station may adjust its transmission signal to compensate for any irregularities caused by the broadcasting environment. The autonomous relay station may further independently configure itself by utilizing pre-coding in optimizing a quality of a service parameter or to implement a distributed MIMO environment. Therefore, as used herein, a configuration change or reconfiguration of an autonomous relay station includes a change in physical position, the direction or configuration of their antennae, or adjustments to its transmitted signal, with or without a physical position or antennae direction change. Moreover, a position change of an autonomous relay station, includes a physical position change or a change in the direction or configuration of its antenna(e).

In some instances, autonomous relay stations may collect information on network usage and configuration, and use algorithms within the autonomous relay station to determine when and/or how to adapt. In some instances, information or commands that cause an autonomous relay station to reconfigure itself may be received from a core network, or from one or more user equipment devices. Generally, the configuration and/or location of such autonomous relay stations is controlled and/or planned by the relay station itself, or by the wireless communication system.

As one example of the use of such an autonomous relay station in accordance with an embodiment of the invention, if it is determined that user equipment in a portion of a wireless cell is experiencing poor reception, the autonomous relay station may be repositioned to alleviate the problem. As another example, an autonomous relay station may be adapted to turn on when mobile usage surpasses a certain threshold and move towards an optimum relay location.

Another type of dynamic relay station is an "opportunistic" relay station. Generally, an opportunistic relay station is a device that may not be primarily intended to be used as a relay station, and may not be under its own control or the control of the communication system, but nonetheless has the ability (if required and if conditions allow) to relay messages within a wireless communication system. Examples of such opportunistic relay stations include user equipment that is able to use spare bandwidth to relay data to and from other user equipment. Since the network communication system (e.g., the core network) generally does not control these opportunistic relays, their numbers, configurations, and movement may arbitrarily change. For example, they may unpredictably drop in or out of use (e.g., by being turned on or off by a user), move within the network in unpredictable and/or arbitrary ways (e.g., as the user moves), or move in or out of the range of other relay stations, base stations, and/or user equipment. Although the movement and availability of opportunistic relay stations may not be as completely controlled as autonomous relay stations, embodiments of opportunistic relay stations may be able to configure themselves as a relay when they determine that conditions are appropriate, or may be configured as a relay by the network (e.g., by the core network, a base station, other user equipment, or other network components). Thus, opportunistic relay stations may lead to an improved quality of service, particularly for users at the edge of a cell or in areas with high interference.

In addition to using dynamic relays, communications systems in accordance with various embodiments of the invention may use static relay stations. Such static relay stations are similar to simplified base stations that are installed in fixed locations by a network provider to assume the tasks of a relay. Such static relays are generally unable to adapt their position to current needs, but are positioned by the network provider at particular positions within a cell. For example, a network provider might position a static relay station in an area of a cell that would otherwise have no reception (i.e., a "dead" area), or at the edge of a cell, or in an area of the cell that is known to have high interference.

Use of static relay stations achieves a high degree of stability, since existing links with static relay stations will not be interrupted by unfavorable position changes of the relay station, as can occur with dynamic relay stations. However, static relay stations are unable to adapt to a changing context, and therefore may achieve a lower quality of service than a network employing dynamic relay stations. Conversely, dynamic relay stations are able to achieve higher quality of service and greater efficiency over larger areas than static relay stations, but a position change could interrupt existing communications links suddenly and unexpectedly. In accordance with various embodiments of the invention, dynamic and static relay stations may be used in parallel, transferring messages in the network in an intelligent manner, to achieve a useful balance between stability and adaptability for a wireless communication network.

In accordance with various embodiments of the invention, unused resources of opportunistic relay stations and autonomous relay stations may be used to reach more distant user equipment, minimize the required transmission power of a base station or the network as a whole, or achieve other improvements in the operation, range, reliability, and/or capacity of a wireless communication system without the need to install additional costly fixed infrastructure. Embodiments of the invention use numerous relay stations, including dynamic relay stations with differing mobility characteristics, and (in some embodiments) static relay stations, in parallel and in an intelligent manner (e.g., such as by using network coding) to improve the operation of a multi-hop wireless communication system. In the case of autonomous relay stations, this may entail having the autonomous relay stations analyze their context, and configure themselves in a manner (e.g., by a position change, rotation, reconfiguration of antennae, etc.) to dynamically improve communications with user equipment.

Embodiments of the invention provide ways in which user equipment and/or a base station can select the "hops" over several relay stations in such a manner that static and dynamic relay stations can be linked in an intelligent manner and used in parallel. In some embodiments, use of these techniques may lead to enhanced quality of service characteristics, and avoidance of problems with such dynamic systems, such as sudden interruption of communication due to an unfavorable repositioning of an autonomous relay station.

Referring to FIG. 1, a simplified example wireless network configuration is described. The network 100 includes a base station 102, a first user equipment 104, and a second user equipment 106. The second user equipment 106 is configured as a dynamic (in this case, an "opportunistic") relay station. The first user equipment 104 is in communication with the base station via downlink 108 and uplink 110. The second user equipment 106, which acts as a relay station, also receives the data being communicated via downlink 108 and uplink 110, and retransmits them—possibly in a modified form—on communication link 112 (which communicates data from uplink 110, possibly in a modified form) and communication link 114 (which communicates data from downlink 112, possibly in a modified form). Both data streams—i.e., uplink 110 and communication link 112 at the base station 102, and downlink 108 and communication link 114 at the first user equipment 104—may be combined and decoded by their respective receivers.

It should be noted that the data on the communication link 114 do not have to be identical to the data on the downlink 108, and the data on the communication link 112 do not have to be identical to the data on the uplink 110. For example, the data on the communication links 112 and/or 114 may be time shifted, differentially coded (e.g., for redundancy similar to incremental redundancy hybrid automatic repeat-request (HARQ)), or transformed or coded in any other way, such that the receiver is able to use the signal to recover the original data.

As used herein, a relay that, instead of simply repeating the data that it receives, transforms the data or combines the data with other received data before re-transmitting it will be referred to as using "network coding". As well as conventional network coding techniques, such as linear network coding, other network coding techniques may be used with dynamic relay stations, as described in greater detail below. In accordance with embodiments of the invention, such network coding techniques may be used on the relay stations, the base station, or the use equipment devices. Generally, devices employing network coding may encode or decode data, and may send subsets of the network encoded data (possibly including the entire network encoded data) to other devices on the network. When receiving network encoded data, a device may assemble subsets of data received from several different sources to decode the data.

Figure 2A:
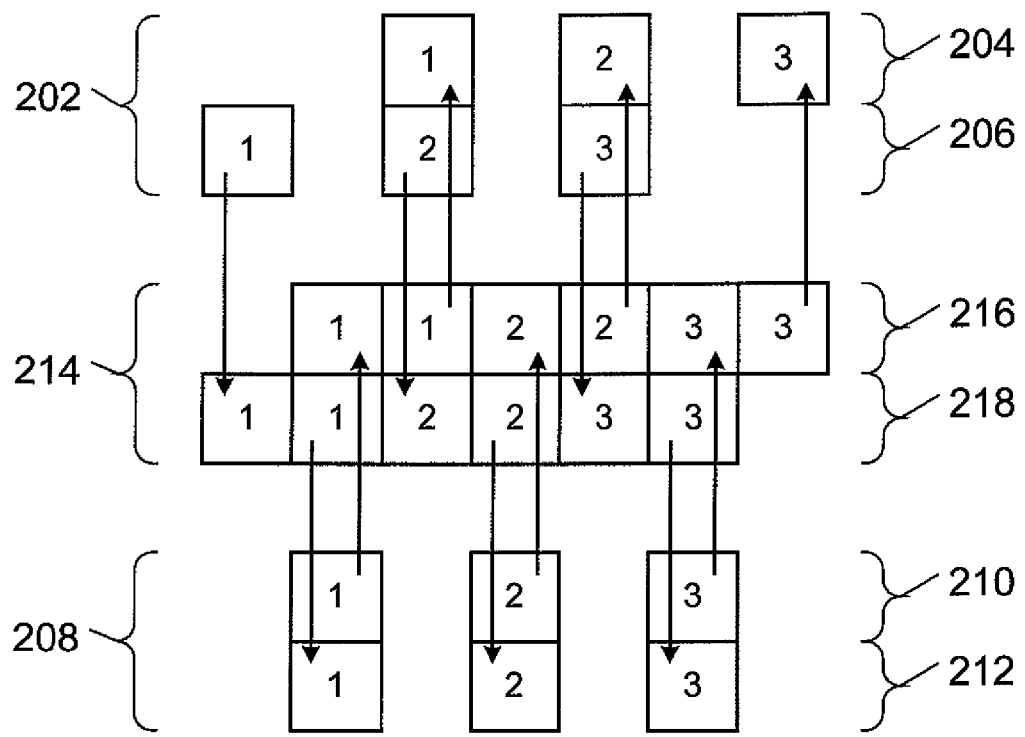
FIGS. 2A and 2B show examples of full duplex FDD communications through a relay, and half duplex communications through a relay, respectively, in accordance with embodiments of the invention.
Figure 2B:
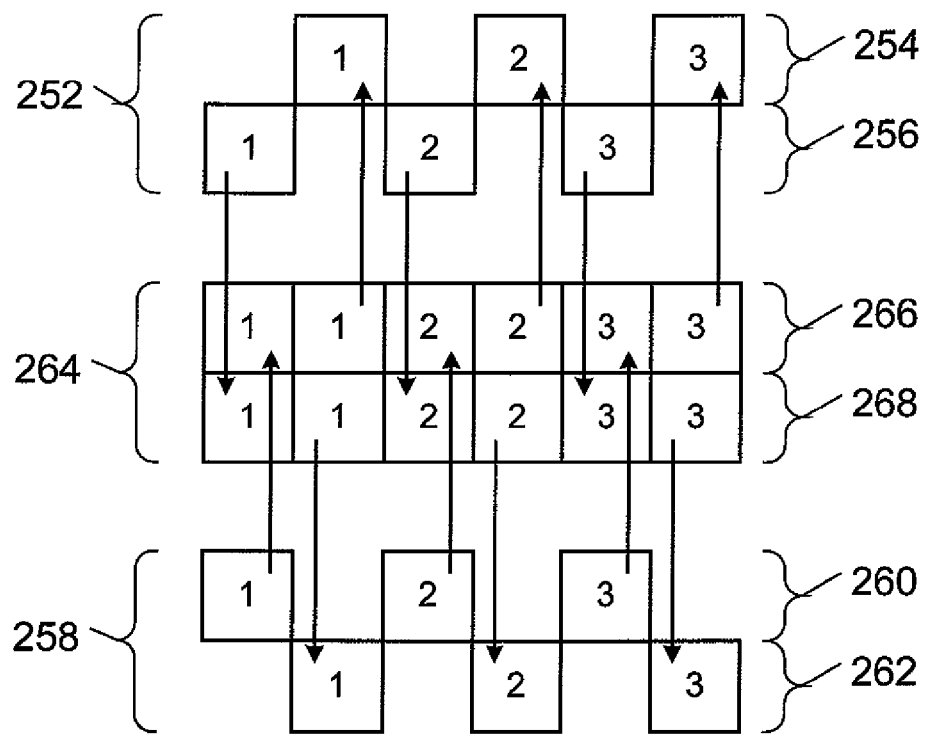

It should be noted that relay stations according to embodiments of the present invention may be configured depending on the duplex method used for communications, such as frequency division duplexing (FDD), half-duplex FDD, or time division duplexing (TDD). As shown in FIGS. 2A and B, in principle, half duplex FDD systems allow essentially the same efficiency with regard to an exploitation of radio resources as full duplex FDD systems. FIG. 2A shows a communication using full duplex FDD of three packets of data, labeled "1", "2", and "3", between a base station 202 (communicating via uplink 204 and downlink 206) and a terminal (user equipment) 208 (communicating via uplink 210 and downlink 212), via a relay station 214 (communicating via uplink 216 and downlink 218), which may be, for example, a dynamic relay station according to various embodiments of the invention. Similarly, FIG. 2B shows a communication using half duplex FDD, between a base station 252 (communicating via uplink 254 and downlink 256) and a terminal (user equipment) 258 (communicating via uplink 260 and downlink 262), via a relay station 264 (communicating via uplink 266 and downlink 268).

This is not generally the case in TDD systems, since the systems are typically unable to receive data from several transmitters simultaneously. There are, however, exceptions, such as the application of receivers that cancel or minimize interference (e.g., similar to downlink advanced receive performance/single antenna interference cancellation (DARP/SAIC) compliant GSM/EDGE receivers), which permit simultaneous reception of several signals.

Figure 3:
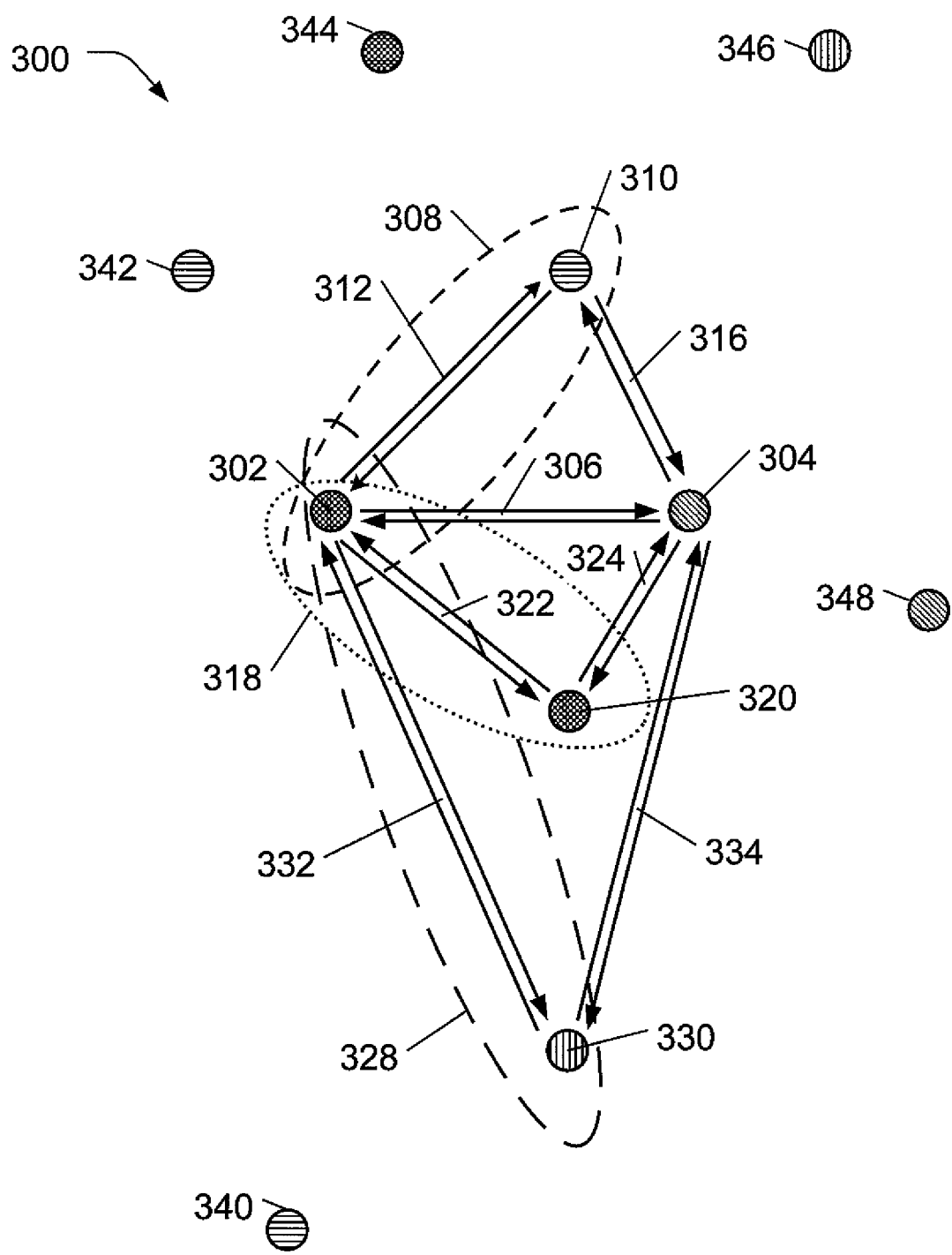
FIG. 3 shows an architectural overview of another example network architecture in accordance with an embodiment of the invention.

Referring now to FIG. 3, an example of a wireless communications network in accordance with an embodiment of the present invention is shown. The wireless communications network 300 includes a first terminal (user equipment) 302 which is in communication with a core network (not shown) through a base station 304. In addition to being in direct communication with the base station 304 through up/down link 306, the first terminal 302 is within the coverage area 308 of an autonomous relay station 310, and communicates with the autonomous relay station 310 through up/down link 312. The autonomous relay station 310 is also in contact with the base station 304 through up/down link 316. Connection via the autonomous relay station 310 provides additional diversity, but may fail if the autonomous relay station re-configures.

The first terminal 302 is also in the coverage area 318 of a second terminal 320, which is acting/configured as an opportunistic relay station. The first terminal 302 communicates with the second terminal 320 through up/down link 322. The second terminal 320 communicates with the base station 304 through up/down link 324. Connection via this opportunistic relay station provides additional diversity, but may fail, for example if the second terminal 320 is moved out of range, or is suddenly turned off by its user.

The first terminal 302 is also in the coverage area 328 of a static relay station 330. The first terminal 302 communicates with the static relay station 330 through up/down link 332. The static relay station 330 communicates with the base station 304 through up/down link 334. Although static relay stations cannot change their positions like autonomous relay stations, static relay stations improve communication stability.

In addition to these relay stations, the wireless communications network 300 may include additional relay stations, such as autonomous relay stations 340 and 342, and additional terminals or other user equipment configured as opportunistic relay stations, such as third terminal 344. The wireless communications network 300 may also include additional static relay stations, such as static relay station 346, and/or additional base stations which may be configured to act as static relay stations, such as standard base station relay station 348. These additional components of the network 300 may be out or range or out of communication with the first terminal 302, or may be in communication with the first terminal 302, connecting the first terminal 302 to the core network through the base station 304 or through other base stations (not shown), via one or more "hops" (not shown).

In accordance with an embodiment of the invention, these various types or relay stations may be used in parallel in an intelligent manner. The exact selection of static, autonomous, or opportunistic relays stations for the communication may depend on the application, and on how much a short and unexpected interruption of communication would damage the application operating on the first terminal 302. For example, an FTP application running on the first terminal 302 may value higher transfer rates at the expense of increasing the probability of packet dropping. With such a preference, autonomous and/or opportunistic relay stations may be selected for many "hops", since use of such relay stations may permit a higher data rate to be achieved, and interruptions can be easily handled in an FTP application if a selected relay station ceases to be in wireless communication. On the other hand, in latency-critical applications, such as VoIP, an interruption-free and stable communication is usually desired, and thus static relay stations, which may provide greater signal stability at the expense of a lower data rate, may be preferred. In some embodiments, the first terminal 302 may request different configurations of its network communications and "hops", depending on the application that is currently in use on the first terminal 302.

Additionally, by connecting to multiple relay stations in parallel, network coding may be used to further increase performance. Using network coding, the various up/down links do not all carry the same data, but instead carry various combinations of the data, such that a complete data stream may be reconstructed or decoded at the first terminal 302 and at the base station 304. Physical-layer network coding may also be applied. Additionally, some embodiments of the present invention may implement one or more dynamic relays stations as a multiple-input multiple-output (MIMO) system, and thereby increase throughput and/or robustness of the network 300.

Further improvements in performance may be achieved in some embodiments by a position-dependent pre-coding, in some embodiments using multiple transmission antennas. In some embodiments, beam shaping may be used to radiate energy as accurately as possible to maximize signal energy at the receiver and to minimize interference energy for other receivers. In some embodiments, a distributed MIMO system may be provided by additional coding.

In some embodiments, diversity effects may be improved by using geographic knowledge, including the positions of the communication units involved in a communication. A relay station can determine the environment by means of its own or signalized channel measurements, and can independently select pre-coding schemes accordingly. Alternatively, these pre-coding schemes cay be sent to the relay station by a central unit. This central unit can evaluate all of the geographic information, and can configure the relay stations in accordance with this geographic information. In some embodiments, this central unit may be the base station or another component of the wireless network. Alternatively, the central unit may be a part of the core network with which the base station communicates.

Configuration of autonomous and opportunistic relay stations may be updated according to changes in the environment. Autonomous relay stations can also determine their configurations independently, taking into consideration the position as well as the pre-coding as parameters for improving their own quality of service (and quality of service for user equipment devices that are communicating through them), and for reducing interference with other signals.

Figure 4:
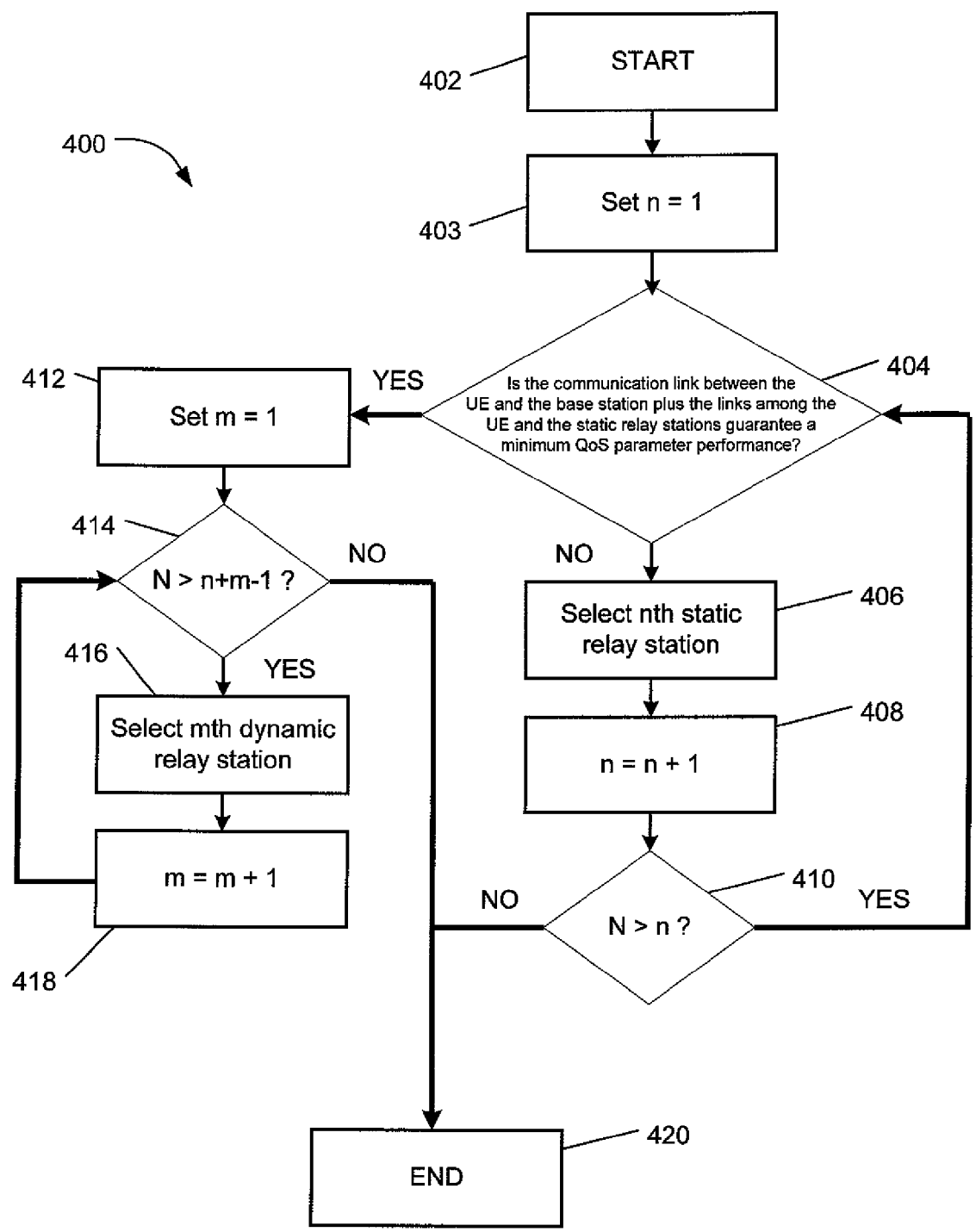
FIG. 4 shows a flowchart of a process for determining a selection of relay stations by a mobile communication device, in accordance with an example embodiment of the invention.

FIG. 4 shows a flowchart of a process 400 to determine a selection of relay stations by a mobile communication device, in accordance with an example embodiment of the present invention. This process is based on a case in which there is direct communication between a mobile communication device, such as the first terminal 302 of FIG. 3, and a base station, such as the base station 304 of FIG. 3. Due to mobility of the mobile communication device, the quality of service of the link decreases, falling below a minimum quality of service. Assuming that the mobile communication device can maintain up to N relay connections and requires a minimum quality of service to maintain its links, it selects the relay stations. To select the relay stations, the mobile communication device first chooses as many static relay connections as are necessary to guarantee a minimum quality of service. This is based on the static relay stations having a lower likelihood of failure than the other relay stations, because they do not re-configure or disconnect themselves. As soon as the mobile communication device reaches its minimum quality of service, if it has not yet reached N active relay connections, it may establish further relay connections to dynamic (i.e., autonomous or opportunistic) relay stations to enhance the actual quality of service. A process such as this might be appropriate for use with an application that values the stability of the connection (at least until the minimum quality of service is reached) above maximizing the data rate.

At 402, the process 400 may be started by the mobile communication device when a quality of service parameter falls below a certain threshold. In an alternative embodiment, a quality parameter of a wireless network may be selected at this step. At 403, n is set to one, with n representing the number of static relay stations the mobile communication device is in wireless communication with. However, n is set to one at 403 because the process assumes that the wireless communication device is normally in direct wireless communication with a base station. The process 400 selects static relay stations before dynamic relay stations, which may be desired if low-latency and similar quality of service parameters are desired.

At 404, the process 400 determines if the communication link between the mobile communication device, or in more general terms UE, and the base station plus the links among the mobile communication device and the static relay stations guarantee a minimum quality of service (QoS) parameter. In an alternative embodiment, the static relay stations may guarantee a minimum quality of a quality parameter of a wireless network.

QoS parameters include, but are not limited to guarantees of a certain level of performance of data flow, including bit rate, delay, jitter, packet dropping probability, and/or bit error rate. Quality parameters include coverage area, data reliability, data capacity of a wireless communication system and transmission power of a base station or the network as a whole. At 404, one or more QoS parameters may be considered. In an alternative embodiment one or more quality parameters may be considered. If a minimum QoS parameter performance is not guaranteed, the process selects an nth static relay station at block 406. Determining which static relay station to select may be based, for example, on a power measurement, the number of UEs already in communication with a relay, a base station command, or a pre-determined fixed order of preference.

At 408, n is increased by one to reflect that the mobile communication device is to wirelessly communicate with another static relay station. Thus, the process 400 generally assumes that the mobile communication device can be in wireless communication with more than one station (i.e., base station or relay station).

At 410, the process 400 determines if the maximum number of stations the mobile communication device can wirelessly communicate with has been met, with N representing the maximum number. If n is equal to N, the process 400 is ended at 420, but if n is less than N, the process 400 is looped back to 404. If a minimum QoS parameter is guaranteed, m is set to one at 412, with m representing the number of dynamic relay stations the mobile communication device may be in wireless communication with.

At 414, the process 400 checks if the maximum number of stations the mobile communication device can wirelessly communicate with has been met. If n+m−1 is equal to N, the process 400 is ended at 420, but if n+m−1 is less than N, then the process 400 continues with 416. At 416, the process 400 selects an mth dynamic relay station. At 418, m is increased by one to reflect the mobile communication device is to wirelessly communicate with another dynamic relay station and is looped back to 414.

Figure 5:
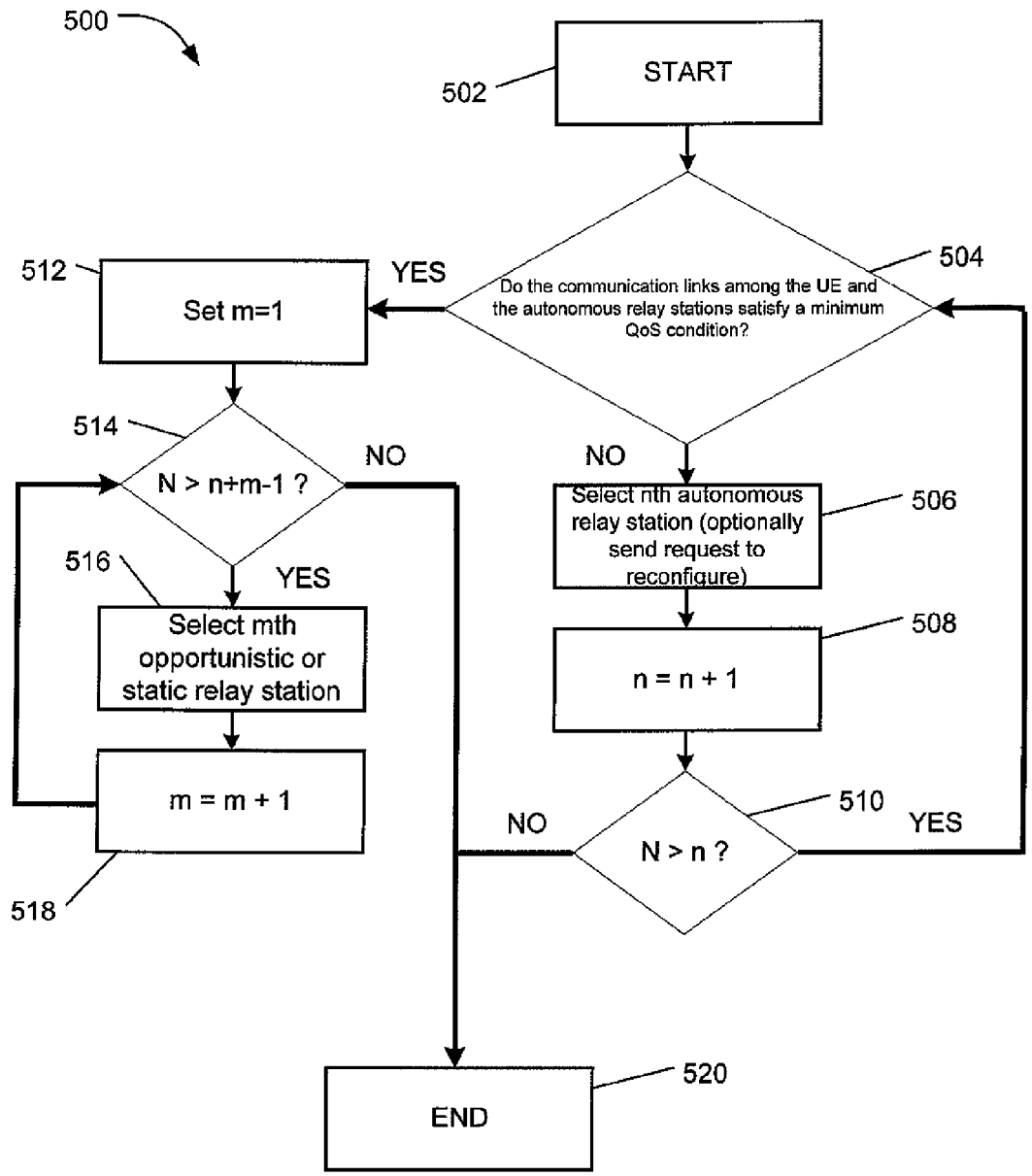
FIG. 5 shows a flowchart of a another process for determining a selection of relay stations by a mobile communication device, in accordance with another example embodiment of the invention.

FIG. 5 shows a flowchart of an alternative process 500 to determine a selection of relay stations by a mobile communication device, in accordance with an example embodiment of the invention that uses best effort delivery of a quality of service parameter. In best effort delivery a user obtains best effort service, meaning quality of service parameters will vary depending on the present traffic load. For best effort delivery, it is not necessary to differentiate among static, opportunistic, or autonomous relay stations. Only the relay station which provides the best quality of service may be selected. The process 500 might be appropriate in cases where the applicable quality of service measure favors data rate over reliability, for example, an FTP application running on User Equipment At 502, the process 500 may be started by the mobile communication device when a best effort service is desired for a quality of service parameter (such as data rate, in this case). Optionally, in some embodiments, at 503 n is set equal to m, which is the number of relay stations a mobile communication device is in wireless communication with before the process 500 was started. The process 500 selects an nth relay station at block 504. Determining which relay station to select may be based, for example, on a power measurement, the number of UEs already in communication with a relay, a base station command, or a pre-determined fixed order of preference.

Optionally, in some embodiments, at 506 a check is made to see if the newly-selected relay station is an autonomous relay station. If so, at 508 the station may be requested to reconfigure to improve performance. At 510, n is increased by one to reflect the mobile communication device is to wirelessly communicate with another relay station.

At 512, the process 500 checks if the maximum number of stations the mobile communication device is already in wireless communicate with has been met, with N representing the maximum number. If n is equal to N, the process 500 is ended at 514, but if n is less than N, the process 500 is looped back to 504.

It will be understood that the process shown in FIGS. 4 and 5 are only two possible process example embodiments of the invention and that there may be many variations or additions. For example, an alternative embodiment may determine a preferred order of selecting relay stations (opportunistic first, static second, etc . . . ) based on which QoS parameters are not being guaranteed. Further, an alternative embodiment may also determine a preferred order of selecting relay stations based on QoS parameters an application may prefer over other QoS parameters.

As has been noted above, one difficulty that may be encountered with dynamic relay stations is a reduction in the reliability of communication links between dynamic relay stations and UE or base stations. This reduction in reliability may result from the dynamic relay stations moving to locations that are either out of range of some (or all) of the user equipment devices and base stations with which the relay station is in communication, or moving to a location where the communication link is of lower quality (e.g., due to geography or interference). Similarly, repositioning or reconfiguring antennae, switching the relay station off, and reconfigurations in general may cause interruptions in communications, and consequent reductions in reliability.

Figure 6A:
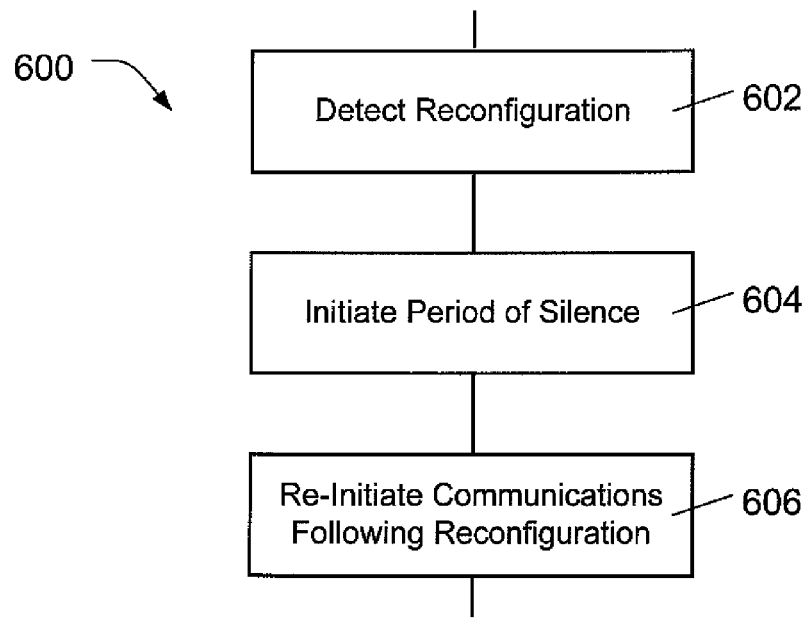
FIGS. 6A and 6B show flowcharts of processes for avoiding unexpected communication breaks during dynamic reconfiguration or repositioning of a dynamic relay station, in accordance with various embodiments of the invention.

According to various embodiments of the invention, this can be overcome in several ways. As shown in FIG. 6A, according to a method 600, a dynamic relay station may detect a reconfiguration condition, such as an imminent change in position, antenna direction, and/or power output at 602. At 604, the relay station may initiate a deliberate period of silence or communication break in order to cleanly end communications prior to or during the initial portion of a reconfiguration. Once the reconfiguration is complete, at 606, the dynamic relay station may re-initiate communications within its reconfigured and/or repositioned context.

Figure 6B:
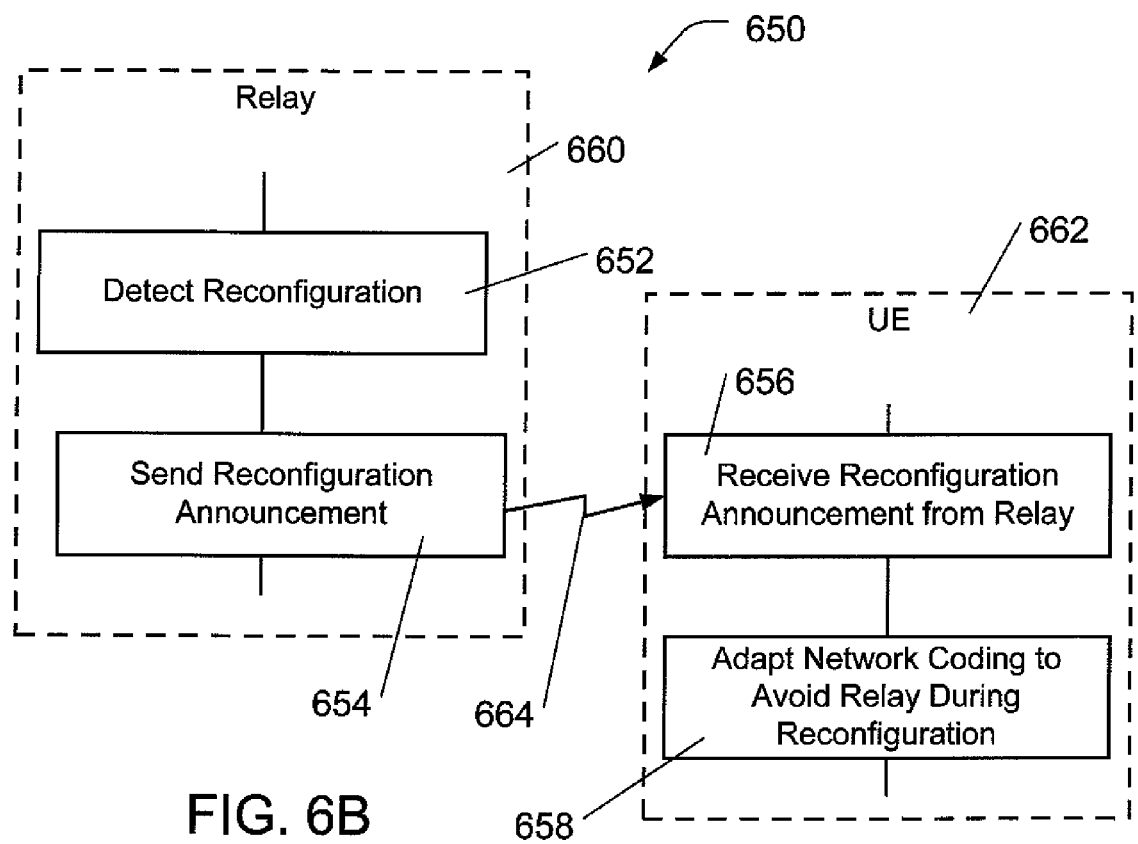

Alternatively, as shown in FIG. 6B, according to the method 650, a relay station may detect a reconfiguration condition, such as an imminent change in position, antenna direction, and/or adjustments to its transmitted signal at 652. At 654, the relay station 660 sends a message 664 to the devices with which it is communicating or (in some embodiments) a broadcast, announcing a reconfiguration or position change. The message 664 is received by a user equipment device 662 at 656, and at 658 this causes the user equipment device to adapt its network coding in such a manner that the relay station that sent the message is not used during its reconfiguration period.

In addition to using the methods discussed above, a dynamic relay station may also adaptively or dynamically change its transmitted signal as a part of the reconfiguration or repositioning process. Doing this may avoid unnecessarily breaking existing connections during a reconfiguration, and to the extent that some connections must be broken (e.g., because they will no longer be in range), it may be possible using such methods to avoid the break in communication being sudden or unexpected.

Figure 7:
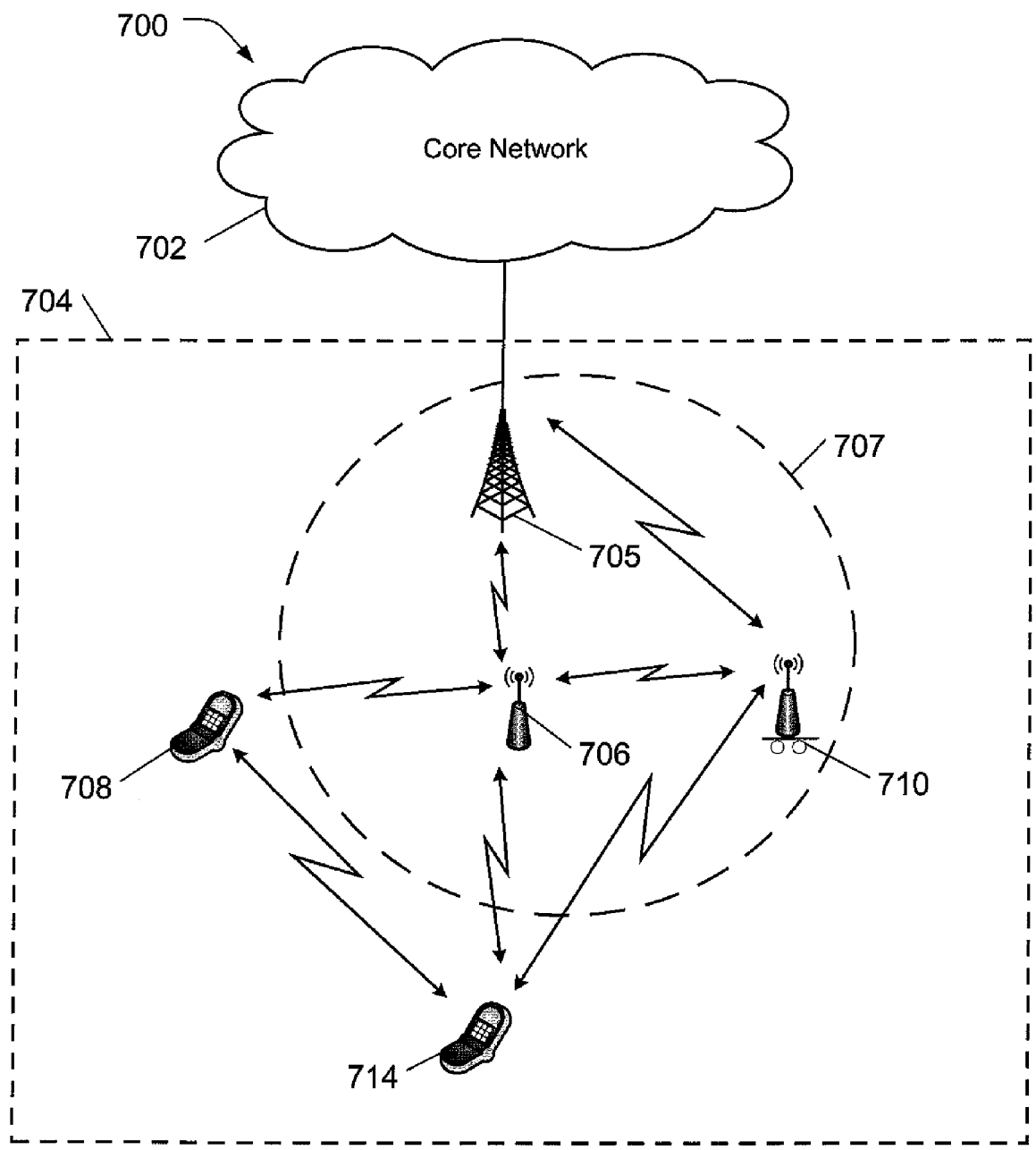
FIG. 7 shows an architectural overview of a further example network architecture in accordance with an embodiment of the invention.

Referring now to FIG. 7, an alternative architectural overview of an example network architecture in accordance with an embodiment of the invention is described. The network 700 includes a "core network" (CN) 702, and a radio network 704. The core network 702 is the central part of the network 700, is normally operated by a communication services provider, and includes both wired and wireless components that provide mobile communication services over large areas to many users. The radio network 704 connects individual users to the core network 702 in order to provide communication services, and includes both wireless and wired components, some of which may be operated by the communication services provider that operates the core network 702, and some of which may be operated by others.

The radio network 704 includes numerous macro cells, such as macro cell 707, which is covered by a base station 705. The base station is connected to the core network 702 and is in wireless communication with a static relay station 706. The static relay station is in wireless communication with an opportunistic relay station 708, an autonomous relay station 710, and a mobile communication device 714. The mobile communication device 714 is also in wireless communication with the opportunistic relay station 708.

The network architecture shown in FIG. 7 may be, for example, an LTE (Long Term Evolution) network. Thus, in some embodiments of such an architecture, OFDMA (Orthogonal Frequency-Division Multiple Access) may be used for communication in an MIMO environment. In some embodiments, SC-FDMA (Single-Carrier Frequency-Division Multiple Access), or other known communication modulation or access schemes may be used.

Data may be network coded by any component (705, 706, 708, and 710-714) in the radio network 704. For example, the mobile communication device 114 may transmit signal A, destined for the base station 705 and the base station 705 may send signal B, destined for the mobile communication device 714. The static relay station 706 may combine signals A and B using network coding (e.g., using xor and/or other operations) and send the combined data to both the base station 705 and the mobile communication device 714. Data may be network coded and decoded multiple times as it transmitted and retransmitted in the radio network 704.

Static, autonomous, and opportunistic relay stations may be configured depending on a selected duplex method, including, but not limited to, full-duplex frequency division duplex (FDD), half-duplex frequency division duplex, or time division duplex. In one embodiment, static, autonomous, and opportunistic relay stations utilize physical layer network coding in conjunction with a half-duplex FDD and QPSK so to increase network throughput.

As mentioned above, the autonomous relay station 710 may adapt its position, antenna direction, and antennae arrangement dynamically. The autonomous relay station 710 may also adapt its transmission characteristics, for example, by sending out a channel impulse and comparing the sent channel impulse to a received channel impulse, and adjusting its transmission signal to compensate for any irregularities caused by the broadcasting environment. Moreover, such information may be shared among other dynamic relay stations. A transmission signal may be adjusted by adapting the position of the transmitter, power output, the antenna direction, and/or the antennae arrangement, or by adapting the signal through signal processing. With the use of GPS modeling, the autonomous relay station 710 may also determine and move to a broadcasting position in order to reduce or increase signal interference. Increasing signal interference may be desired in a MIMO environment.

Depending on the needs of neighboring macro cells (not pictured), the autonomous relay station may move in and out of the macro cell 707 and neighboring cells or adjust its antenna or antennae to improve a quality of the neighboring macro cell.

The autonomous relay station 710 may further independently configure itself by utilizing pre-coding in optimizing a quality of a service parameter. The radio network 704 may also enhanced its performance by using position-dependent pre-coding so to implement a distributed MIMO environment.

Thus, the autonomous relay station 710 may adapt to its environment by means of its own signalized channel measurements and can independently select a respective pre-coding scheme depending on the coding and network architecture the radio network 704 employs. Alternatively, pre-coding schemes may be sent to the autonomous relay station 710 by the base station 705 or another relay station. In one embodiment, the base station 705 can evaluate geographic information and configure the autonomous relay station 710 accordingly. For example, if the radio network 704 employs a distributed MIMO environment, the base station 705 may take geographical information into account and position the autonomous relay station 710 with respect to the static relay station 706 so that a optimum interference signal is received by the mobile communication device 714.

In the example embodiment shown in FIG. 7, the opportunistic relay station 708 is embodied as a mobile communication device. The opportunistic relay station 708 may configure itself as a relay station or be configured as a relay by any component (705, 706, and 710-714) of the radio network 704. As seen in FIG. 7, even though the opportunistic relay station 708 is outside the macro cell 707, the static relay station 706 is in wireless communication with the opportunistic relay station 708. Thus, the opportunistic relay station 708 may send data transmitted from the base station 705 to the mobile communication device 714, even though both the opportunistic relay station 708 and the mobile communication device 714 are outside the broadcast range of the base station 705. The opportunistic relay station 708 may also move in and out of various cells.

Since dynamic relay stations can change their physical position and/or antenna direction as described above, dynamic relay station may change their transmitting characteristic to avoid lowering the performance of the radio network. A position change may be a change in a physical position, a change in antenna direction, a change in antennae configuration, or all three. In one embodiment, the dynamic relay station 710 may go silent until the position change is complete. In another embodiment, the dynamic relay station 710 may announce a position change and the mobile communication device 714 or the base station 705 adapts the network coding in such a way that the mobile communication device 714 or the base station 705 is unaffected. In yet another embodiment, the dynamic relay station 710 may adaptively change its transmitted signal during a position change so that the signal received by the mobile communication device 714 or the base station 705 does not cause undesired interference.

Figure 8A:
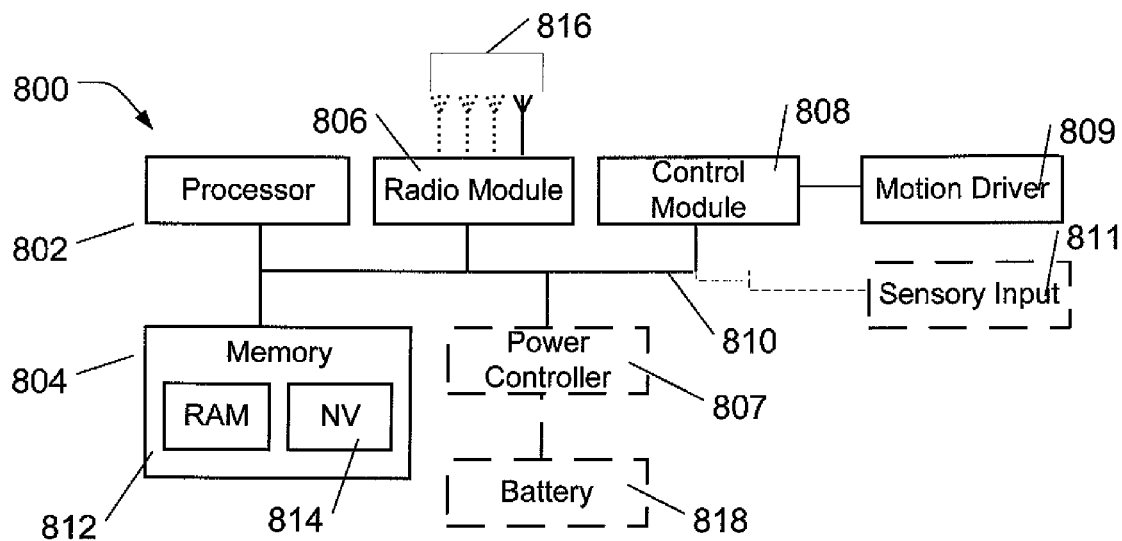
FIGS. 8A and 8B are block diagrams illustrating example architectures for an autonomous relay station and a opportunistic relay station in accordance with an embodiment of the invention.

FIG. 8A shows a block diagram of an example architecture for an autonomous relay station, such as the autonomous relay station 710 of FIG. 7. The autonomous relay station 800 includes a processor 802, memory 804, a radio module 806, a power controller 807, and a control module 808, connected by a bus 810. In some embodiments, the memory 804 may include random access memory 812, such as conventional DRAM, and non-volatile memory 814, such as conventional flash memory, for storing the firmware that operates the autonomous relay station 800, as well as other parameters, settings, geographical information, or pre-coding that should be retained by the autonomous relay station 800.

The radio module 806 may include one or more antennae 816, which is/are used for communication wirelessly with one or more mobile communication devices, relay stations, and base stations. The use of multiple antennae is especially advantageous if the autonomous relay station 800 is in a MIMO environment.

The control module 808 takes in instructions from the processor 802 and/or the memory 804. The control module 808 may then send signals to a motion driver 809 which engenders and controls motion for the autonomous relay station 800 via a motor or similar device (not shown). Examples of motion include changing a physical location of the autonomous relay station 800, a direction of the antenna or antennae 816, and a configuration of the antennae 816. Sensory input 811 may also be used so as to intelligently control the motion of the autonomous relay station 800. For example, the autonomous relay station 800 may include infrared sensors (not shown) in order to avoid collisions with surrounding objects.

The autonomous relay station 800 may be powered by a conventional power connection (not shown), solar cells (not shown), or by other known methods of powering an electronic device. In some embodiments, the autonomous relay station 800 may include an internal power source 818, such as a battery (which may be a rechargeable battery) connected to the power controller 807.

It will be understood that the architecture shown in FIG. 8A is only one possible architecture for the autonomous relay station 800, and that there may be many variations or additions to the architecture. For example, the autonomous relay station 80 may include I/O devices, such as a display (not shown), wheels or tracks (not shown) so that the autonomous relay station 800 may move freely or on a fixed path across a terrain, or motors to move and configure an array of the antennae 816.

It should be noted that an architecture similar to that shown in FIG. 8A may also be used for static relay stations and/or base stations. For a static relay station, there would typically be no need for the control module 808, motion driver 809, or sensory input 811. A base station would also typically lack these components, and would typically have an additional network interface (not shown), to connect the base station to the core network.

Figure 8B:
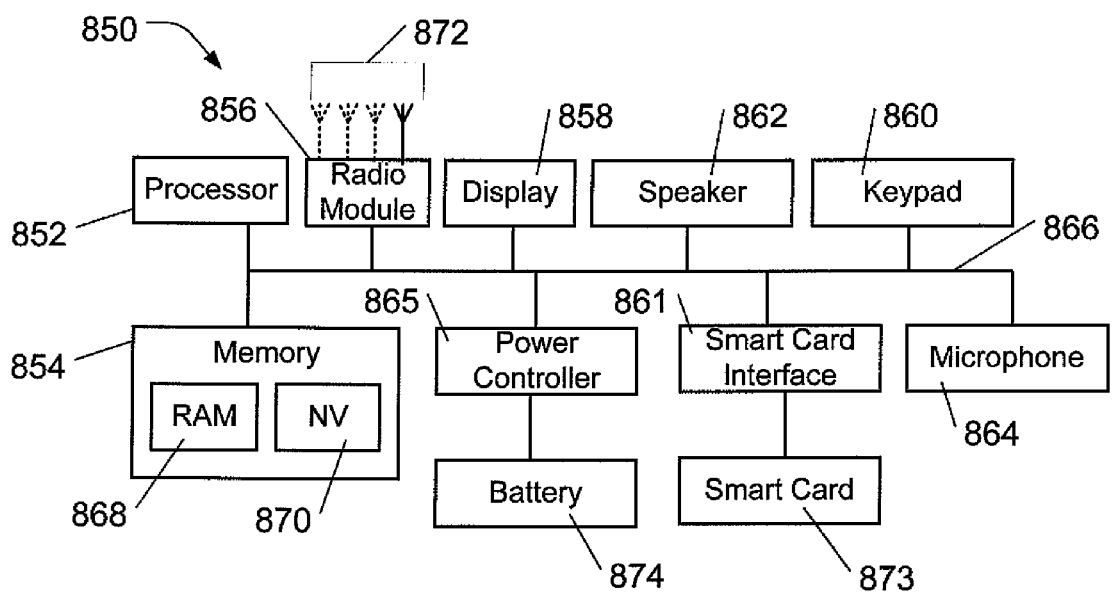

FIG. 8B shows a block diagram of an example architecture of an opportunistic relay station, such as the opportunistic relay station 708 of FIG. 7 (in this embodiment, a mobile communication device), for use with embodiments of the invention. The opportunistic relay station 850 includes a processor 852, memory 854, a radio module 856, a display 858, a keypad 860, a smart card interface 861, a speaker 862, a microphone 864, and a power controller 865, all connected by a bus 866. In some embodiments, the memory 854 may include random access memory 868, such as conventional DRAM, and non-volatile memory 870, such as conventional flash memory, for storing the firmware that operates the opportunistic relay station 850, as well as other parameters and settings that should be retained by the opportunistic relay station 850. For example, the firmware may allow the opportunistic relay station 850 to operate as a relay when the opportunistic relay station 850 is not being used by a user. The radio module 856 may include an antenna or antennae 872, and may be used to communicate wirelessly with a base station or a static, autonomous, or another opportunistic relay station.

The smart card interface 861 may be used to connect a smart card 873 to the opportunistic relay station 850. Examples of such smart cards include SIM (Subscriber Identity Module) cards, UICC (Universal Integrated Circuit Card) smart cards with integrated SIM or USIM (Universal Subscriber Identity Module), or other types of smart cards.

The opportunistic relay station 850 may be housed in a compact portable housing (not shown). For purposes of mobility, the opportunistic relay station 850 would typically be powered by a battery 874 connected to the power controller 865.

It will be understood that the architecture shown in FIG. 8B is only one possible architecture for an opportunistic relay station 850. For example, opportunistic relay stations may also include personal digital assistances, portable music devices, portable gaming devices, notebook computers, and similar devices.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for communicating data between a mobile communication device and a core network, the method comprising:
    using network coding to encode the data; and
    communicating a subset of the encoded data between the mobile communication device and the network through a dynamic relay station;
    wherein the dynamic relay station is able to dynamically change its relay coverage area or signal; and
    wherein the dynamic relay station further enters a period of silence during a reconfiguration.

2. The method of claim 1, wherein communicating a subset of the encoded data between the mobile communication device and the core network through a dynamic relay station comprises communicating the subset of the encoded data between the mobile communication device and the core network through an autonomous relay station; and
    wherein an autonomous relay station is a dynamic relay station capable of dynamically adapting itself by controlling attributes including: physical position, direction of antenna or configuration of antenna.

3. The method of claim 1, wherein communicating a subset of the encoded data between the mobile communication device and the core network through a dynamic relay station comprises communicating the subset of the encoded data between the mobile communication device and the core network through an opportunistic relay station; and
    wherein an opportunistic relay station is a device capable of becoming a dynamic relay station when uncontrolled conditions become appropriate including: physical position and power requirements.

4. The method of claim 1, further comprising communicating the subset of the encoded data between the mobile communication device and the core network through a static relay station.

5. The method of claim 1, further comprising decoding the subset of encoded data by the dynamic relay station.

6. The method of claim 1, further comprising communicating the subset of the encoded data between the mobile communication device and the core network through a base station.

7. The method of claim 6, further comprising decoding the subset of encoded data by the base station.

8. A method for optimizing resources of a wireless network, the method comprising:
   determining a quality parameter of the network to improve; and
   dynamically changing a position of an autonomous relay station based upon the determination of the quality parameter of the network to improve, the position change improving the quality parameter of the network;
   wherein an autonomous relay station is a dynamic relay station capable of dynamically adapting itself by controlling attributes including: physical position, direction of antenna or configuration of antenna.

9. The method of claim 8, wherein determining the quality parameter of the network to improve comprises selecting the quality parameter from a group consisting of extending a coverage area of the network, minimizing a required transmission power of the network, increasing a data capacity of the network, or increasing a data reliability of the network.

10. The method of claim 8, wherein changing the position of the autonomous relay station comprises changing a physical location of the autonomous relay station.

11. The method of claim 8, wherein determining the quality parameter of the network to improve comprises determining that a quality of service parameter of a first communication link is below a minimum quality of service.

12. The method of claim 11, further comprising establishing a second communication link with the autonomous relay station, the second communication link communicating data in parallel with the first communication link.

13. The method of claim 8, further comprising selecting one or more static relay stations until a minimum quality level of the quality parameter is achieved.

14. The method of claim 8, further comprising relaying network encoded data through the autonomous relay station.

15. A method for selecting relay stations to be in wireless communication with a mobile communication device, the method comprising:
   determining that a quality of service parameter of a first communication link is below a minimum quality of service;
   dynamically selecting at least one relay station from a relay group comprising a dynamic relay station, the selection based upon the determination of the quality of service parameter and the selected relay station not being used in the first communication link;
   establishing a second communication link with the selected relay station, the second communication link communicating data in parallel with the first communication link; and
   communicating network encoded data through the first and/or the second communication link;
   wherein the dynamic relay station is able to dynamically change its relay coverage area or signal.

16. The method of claim 15, wherein selecting at least one relay station from the relay group comprises selecting at least one relay station from the relay group comprising a static relay station, an autonomous relay station, or an opportunistic relay station;
   wherein an autonomous relay station is a dynamic relay station capable of dynamically adapting itself by controlling attributes including: physical position, direction of antenna or configuration of antenna; and
   wherein an opportunistic relay station is a device capable of becoming a dynamic relay station when uncontrolled conditions become appropriate, including: physical position and power requirements.

17. The method of claim 15, wherein selecting at least one relay station from a relay group comprises selecting the relay station from the relay group based at least in part on a power measurement.

18. The method of claim 15, further comprising continuing selecting a relay station from the relay group until a minimum quality of service is achieved or the mobile communication device reaches a maximum number of communication links.

19. A method for selecting relay stations to be in wireless communication with a mobile communication device, the method comprising:
   determining a best effort service is desired for a quality of service parameter;
   dynamically selecting at least one relay station from a relay group comprising a dynamic relay station, the selected relay station not being used in the first communication link;
   establishing a communication link with the selected relay station; and
   communicating network encoded data through the communication link;
   wherein the dynamic relay station is able to dynamically change its relay coverage area or signal.

20. A dynamic relay station for communicating data between a mobile communication device and a core network, the dynamic relay station comprising:
   a processor;
   a radio module; and
   a memory, the memory comprising a set of instructions that when executed by the processor causes the dynamic relay station to relay network encoded data;
   wherein the dynamic relay station is able to dynamically change its relay coverage area or signal; and
   wherein the dynamic relay station is further configured to enter a period of silence during a reconfiguration.

21. The dynamic relay station of claim 20, wherein the dynamic relay station comprises an opportunistic relay station;
   wherein an opportunistic relay station is a device capable of becoming a dynamic relay station when uncontrolled conditions become appropriate, including: physical position and power requirements.

22. The dynamic relay station of claim 20, wherein the dynamic relay station comprises an autonomous relay station, the autonomous relay station further comprising a motion driver, wherein the memory further comprises instructions that when executed by the processor cause the autonomous relay station to engage the motion driver to engender a position change of the autonomous relay station;
   wherein an autonomous relay station is a dynamic relay station capable of dynamically adapting itself by controlling attributes including: physical position, direction of antenna or configuration of antenna.

23. A wireless network for communicating data between a mobile communication device and a core network, the wireless network comprising:
   a base station;
   the mobile communication device; and
   a dynamic relay station configured to communicate a network encoded subset of the data between the mobile communication device and the base station;

wherein the dynamic relay station is able to dynamically change its relay coverage area or signal; and wherein the dynamic relay station is further configured to enter a period of silence during a reconfiguration.

24. The wireless network of claim 23, wherein the dynamic relay station comprises an autonomous relay station;

wherein an autonomous relay station is a dynamic relay station capable of dynamically adapting itself by controlling attributes including: physical position, direction of antenna or configuration of antenna.

25. The wireless network of claim 24, wherein the base station transmits pre-coding information to at least the autonomous relay station.

26. The wireless network of claim 24, wherein the autonomous relay station relay generates pre-coding information.

27. The wireless network of claim 25, wherein the pre-coding information is configured to facilitate a distributed MIMO environment.

28. The wireless network of claim 23, wherein the dynamic relay station comprises an opportunistic relay station;

wherein an opportunistic relay station is a device capable of becoming a dynamic relay station when uncontrolled conditions become appropriate, including: physical position and power requirements.

29. The wireless network of claim 23, wherein the dynamic relay station is further configured to relay MIMO signals.

30. The wireless network of claim 23, wherein the dynamic relay station is further configured to adaptively change the subset of network encoded data so that the subset of network encoded data does not cause interference with another subset of network encoded data.

31. A wireless network for communicating data between a mobile communication device and a core network, the wireless network comprising:

a base station;

the mobile communication device; and a dynamic relay station configured to communicate a network encoded subset of the data between the mobile communication device and the base station;

wherein the dynamic relay station is able to dynamically change its relay coverage area or signal; and wherein the dynamic relay station is further configured to send a reconfiguration message, and wherein at least one of the mobile communication device and the base station is configured to adapt its network encoding when the reconfiguration message is received, such that the at least one of the mobile communication device and the base station is not affected during a reconfiguration.

32. A method for communicating data between a mobile communication device and a core network, the method comprising:

using network coding to encode the data; and communicating a subset of the encoded data between the mobile communication device and the network through a dynamic relay station;

wherein the dynamic relay station is able to dynamically change its relay coverage area or signal and wherein the dynamic relay station sends a reconfiguration message, and wherein at least one of the mobile communication device and the network is configured to adapt its network encoding when the reconfiguration message is received, such that at least one of the mobile communication device and the network is not affected during a reconfiguration.

* * * * *